US008411567B2

(12) United States Patent
Wong et al.

(10) Patent No.: US 8,411,567 B2
(45) Date of Patent: Apr. 2, 2013

(54) SWARM INTELLIGENCE BASED METHODS TO ENABLE COOPERATIVE COMMUNICATION IN A MESH NETWORK

(75) Inventors: Wendy C. Wong, San Jose, CA (US);
Timothy F. Cox, Palo Alto, CA (US);
Ozgur Oyman, San Jose, CA (US);
Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 126 days.

(21) Appl. No.: 12/803,577

(22) Filed: Jun. 30, 2010

(65) Prior Publication Data

US 2012/0002569 A1 Jan. 5, 2012

(51) Int. Cl.
*G01R 31/08* (2006.01)
(52) U.S. Cl. ........................................ 370/231; 370/237
(58) Field of Classification Search .................. 370/229, 370/252, 254, 255, 312, 338
See application file for complete search history.

(56) References Cited

U.S. PATENT DOCUMENTS

| | | | |
|---|---|---|---|
| 5,359,600 A | 10/1994 | Ueda et al. | |
| 2004/0156345 A1 | 8/2004 | Steer et al. | |
| 2006/0120371 A1* | 6/2006 | Huang et al. ................. | 370/392 |
| 2007/0286097 A1* | 12/2007 | Davies ........................... | 370/255 |
| 2008/0002599 A1* | 1/2008 | Yau et al. ....................... | 370/310 |
| 2008/0267106 A1* | 10/2008 | Buddhikot et al. ........... | 370/312 |
| 2010/0309841 A1* | 12/2010 | Conte ............................ | 370/328 |
| 2011/0267981 A1* | 11/2011 | Davies ........................... | 370/255 |

FOREIGN PATENT DOCUMENTS

| | | |
|---|---|---|
| WO | 2012/012185 A2 | 1/2012 |
| WO | 2012/012185 A3 | 6/2012 |

OTHER PUBLICATIONS

International Search Report and Written Opinion received for PCT Patent Application No. PCT/US2011/042419, mailed on May 8, 2012, 9 pages.
Bravo, "Cooperative Relay Communications in Mesh Networks," IEEE 10th Workshop on Signal Processing Advances in Wireless Communications, Jun. 21-24, 2009, pp. 499-503.
Kejun Liu, "An Acknowledgment-Based Approach for the Detection of Routing Misbehavior in MANETs", IEEE Transactions on Mobile Computing, vol. 6, Issue 5, May 2007, pp. 536-550.

* cited by examiner

*Primary Examiner* — Jung Park
(74) *Attorney, Agent, or Firm* — Forefront IP Lawgroup, PLLC (57) ABSTRACT

A mesh network implements swarm intelligence for cooperative communication between nodes in the mesh network. In particular determination is made at a node in the mesh network, and cooperation occurs with other nodes in forwarding messages and packets in the mesh network in an independent and distributed manner without real time handshake.

17 Claims, 5 Drawing Sheets

SWARM INTELLIGENCE BASED METHODS TO ENABLE COOPERATIVE COMMUNICATION IN A MESH NETWORK

BACKGROUND

A mobile area network or MANET can be a mobile "ad hoc" or mobile mesh network. The MANET can be formed by a self-configuring network of communication devices or mobile devices. Such devices can be connected to one another by wireless links. Devices that are connected to one another the MANET are considered neighbor devices. Each device can be free to move independently, and change neighbors, as the device moves through the MANET. The devices at times may forward traffic unrelated to their own use (i.e., passes information on the behalf of other devices, and acting as a router to other devices. In general, the devices can be referred to as "nodes" in the network (MANET).

MANETs can be implemented for different uses and environments. Examples of such implementations include classroom environments (i.e., educational institutions); conference halls; military deployments; hospitals and clinics (e.g., patient vital sign monitoring; sensor networks deployed to monitor environment; smart grid; oil pipelines; train tracks, and other infrastructures. Other implementations of MANETs include client cloud computing environments where client machines (i.e., nodes) network (i.e., connect) together to meet user computing needs and enable collaboration. In addition, "smart" homes with home devices and/or appliances that are networked together for entertainment, home computing, and energy saving purposes can make use of MANETs.

Issues and problems can occur in MANETs, including quality of service or QoS. QoS involves assuring that transmissions are effectively sent from source nodes to destination nodes. A dynamic mesh network, such as a MANET involves addressing throughput and link (e.g., node to node) outages. Ideally, the MANET should provide a cooperative distributed process between the nodes with low overhead costs. In typical MANETs, cooperating nodes may be determined without providing any algorithms on how those cooperating nodes are chosen.

Certain high performance mesh networks may be populated a number of user nodes that establish full connectivity can be defined by a multi-hop routing plan. When hops within the mesh (e.g., MANET) are perturbed by a dynamic environment the routing plan can require repair that can significantly increase the network signaling overhead.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Overview

Embodiments described herein are directed to improve user Quality of Service (QoS), throughput, and reduce link outage in a dynamic mesh network, such as a mobile area network or MANET. A distributed cooperative process referred to as "swarm intelligence", with low overhead can be implemented. In certain embodiments, in a network where connectivity is established or defined by a multi-hop routing plan, compensation can be made to account for dynamically perturbed hops.

In particular, the following concepts can be implemented: cooperation in the communication system and threshold based resource allocation model. Traditionally, cooperation between nodes can be implemented for communication systems making use of multi-hop protocols in mesh networks, but the cost of cooperation can be costly and significant. Therefore, it is proposed that a hybrid automatic repeat request or HARQ, triggered cooperation method/approach be implemented that can lead to lower overhead and higher bandwidth/power efficiency. Threshold based resource allocation model, is based on observing "ant" societies, where individual "ants" can decide when, where, and how to react to, and engage in, a task to best serve the needs of the "colony" without communication with other ants. In this analogy, nodes are the "ants", and the network is the "colony." In other words, nodes decide how to cooperate with one another. Collectively, the concepts that are implemented can be considered as "swarm intelligence" for use in cooperative communication of nodes in a network. The concepts are directed to providing a scheme that enables automatic cooperation decision in a MANET or mobile ad hoc network, with no real time handshake among the cooperating nodes. This can increase system reliability by automatically boosting the system signal to noise ratio (SNR) without incurring overhead and interference.

A determination can be made as to cooperating nodes that can provide the most effective help and reduce network interference levels in a distributed manner. In addition, when applied to a MANET setting, the described algorithms can enable cooperative communication in a pre-emptive fashion by identifying the best links over which cooperation should occur to ensure that fewer re-transmissions are necessary over cooperative links and thereby enable higher throughput, spectral efficiency, and energy efficiency.

Illustrative Network

Figure 1:
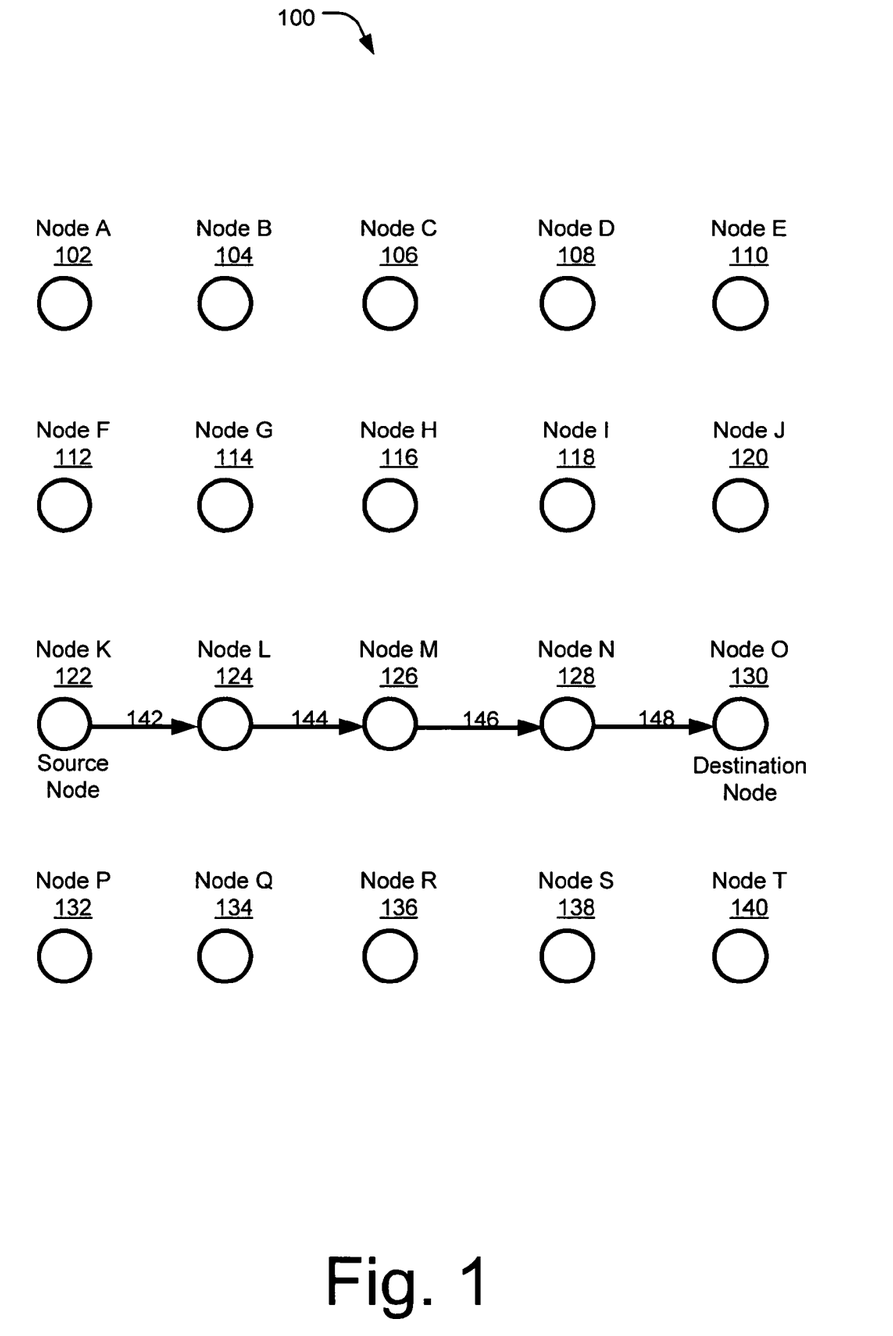
FIG. 1 is an illustrative mobile mesh network of nodes that implement swarm intelligence cooperative communication.

FIG. 1 shows a network 100 that implements swarm intelligence for cooperative communication between nodes. Network 100 can be one of various networks, and particularly a mobile area network or mobile "ad hoc" network, generally referred to as MANET. Network 100 includes multiple nodes that may be added or taken away. Each device or node is free to move independently and change neighbors as it moves through the network 100. Shown in this example are the following: Node A 102, Node B 104, Node C 106, Node D 108, Node E 110, Node F 112, Node G 114, Node H 116, Node I 118, Node J 120, Node K 122, Node L 124, Node M 126, Node N 128, Node O 130, Node P 132, Node Q 134, Node R 136, Node S 138, and Node T 140. It is contemplated that in certain implementations, irregularly placed node locations, can also be implemented.

The Nodes 102-140 can communicate with one another using various communication protocols or standards. Exemplary standards include IEEE 802.11 and code division multiple access (CDMA). Nodes 102-140 communicate via wireless interfaces. Data or messages can be transmitted as packets, which can be encoded using various encoding schemes/standards.

As mobile devices, the Nodes 102-140 are able to move throughout the network 100 as discussed above. Nodes 102-140 can be used as routers or relay devices for their neighboring nodes. Each of the Nodes 102-140 can forward traffic (i.e., packets) that may not be related to the particular node's uses, the particular node acting as a router for other nodes.

In this example, Node K 122 is considered a "Source Node" which desires to transmit or send a message to a "Destination Node" 130. A routing plan is determined using intermediate nodes to pass on the packet. In this case, the packet is passed from the "Source Node" Node K 122 to Node L 124 (represented by link 142); Node L 124 relays the message to Node M 126 (represented by link 144); Node M 126 relays the message to Node N 128 (represented by link 146); and Node N 128 relays the message to Node O 130 (represented by link 148). The routing plan in this example would be Node K 122/Node L 124/Node M 126/Node N 128/Node O 130.

Figure 2:
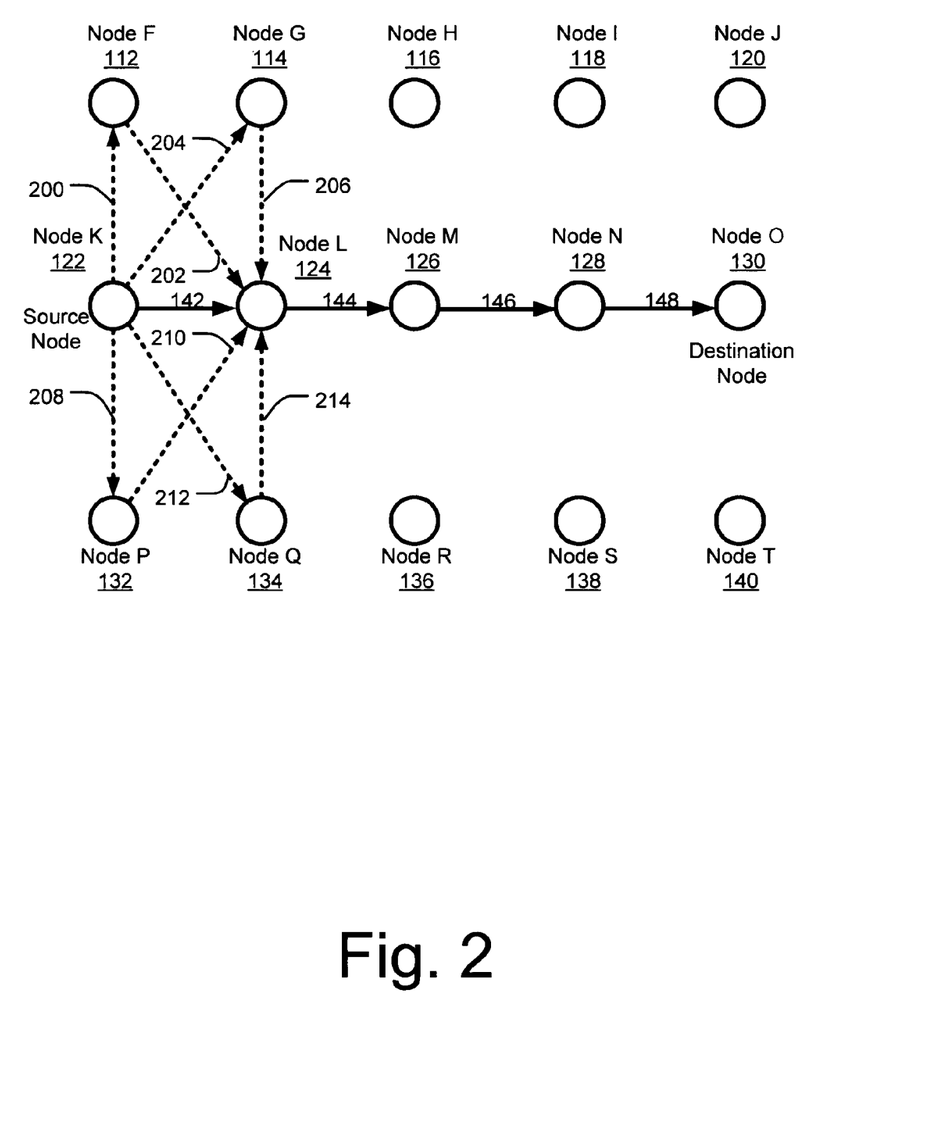
FIG. 2 is an illustrative sub network that shows how transmissions are supported by neighboring nodes.

Referring now to FIG. 2, illustrated is a sub network showing how transmissions can be supported by neighboring nodes. As discussed, the MANET or network 100 is a complete mesh with regularly placed Nodes 102-140. Established routing plans can be provided, from which each node is provided a routing table. In this example, each node can only communicate with its eight immediate neighbor nodes. For example, the "Source Node" Node K 122 communicates with Node F 112, Node G 114, Node L 124, Node P 132 and Node Q 134. Node K 122 can communicate with the three preceding nodes (not shown); however, since the packet transmission is moving forward, only the relevant cooperating nodes are shown. Therefore, Node F 112 can be used as a cooperating node to relay a packet from Node K 122 to Node L 124, as represented by the links 200 and 202. Likewise, Node G 114 can be implemented in a similar manner, as represented by links 204 and 206; Node P can be implemented in a similar manner, as represented by links 208 and 210; and Node Q 134 can be implemented in a similar manner, as represented by links 212 and 214. Therefore, neighboring nodes can "hear" the messages (packet transmission) and are available to assist in transmitting the messages. However, a determination is needed as to when neighboring nodes are to assist. With cooperation or assistance from neighboring nodes, the packet or message strength can increase (i.e., more nodes forwarding the packet/message to succeeding nodes). In certain instances, it may not be desirable for nodes to assist/cooperate, since this may increase the noise at other nodes in the network. The determination is further discussed below in reference to the forwarding function $f(P(\text{forwarding}))$.

Figure 3:
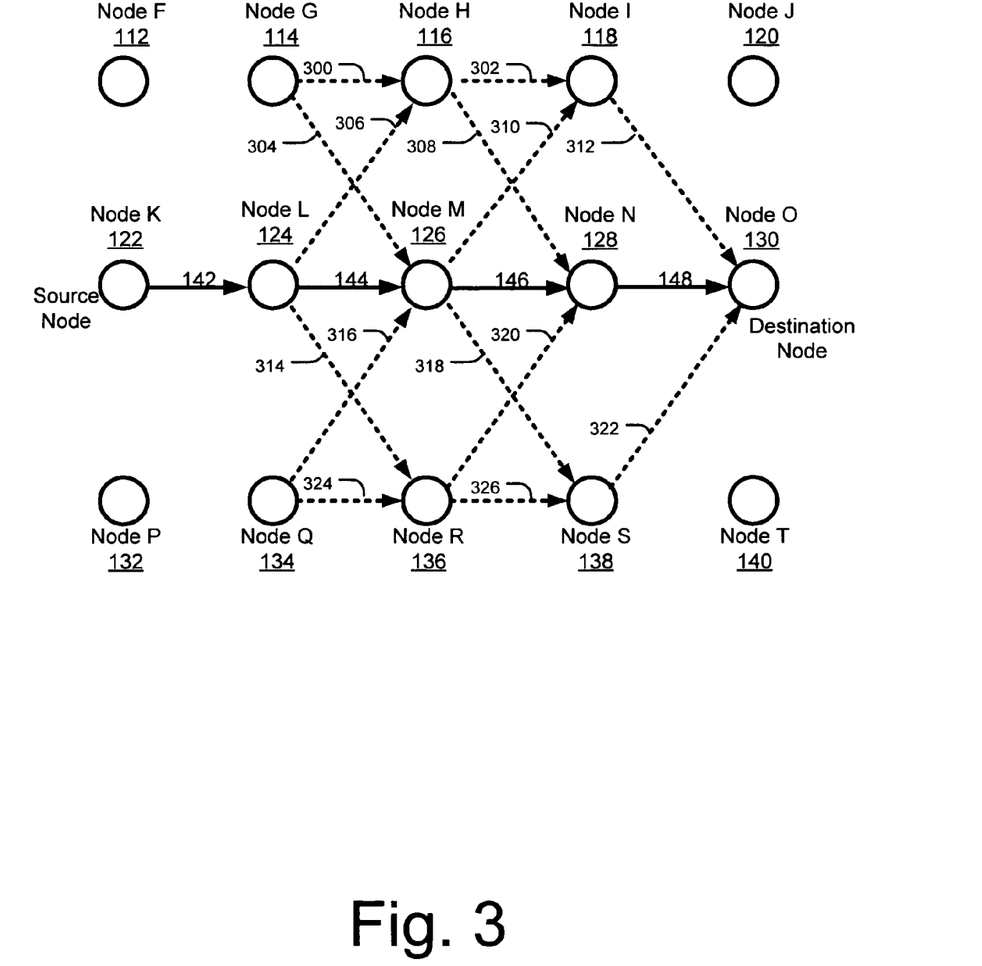
FIG. 3 is an illustrative sub network that shows swarm intelligence of cooperative communication in forwarding a transmission.

Now referring to FIG. 3, illustrated is a sub network that shows swarming intelligence of cooperative communication. In particular, swarm movement of cooperating nodes is illustrated. The links 300 to 326 show packet transmission paths from which packets can be sent; in this example, a truncated path is from Node L 124 to Node O 130 (the entire path as discussed above is from Node K 122 to Node O 130).

Considering that the routing table (routing plan) has been established as packets to be delivered from "Source Node" Node K 122 to "Destination Node" Node O 130, an issue can be how to enable reliable communication through cooperation among nodes in the Node K 122 to Node O hops, after the routing table is established. When any hop(s) in this multi-hop route is (are) perturbed, neighboring nodes to automatically decide to participate in a cooperative scheme to successfully compensate for any failed parts of the multi-hop route plan. This scheme is described below.

For nodes that were able to correctly decode packets destined for neighboring nodes, they can choose to forward the packets to the next hop destination according to a function $f(P(\text{forwarding}))$ derived from the following "ant" colony resource allocation model:

$$P(\text{forwarding}) = \frac{\text{NBR\_RH} \times \text{stimulus}^2}{\text{stimulus}^2 + \text{threshold}^2} \quad (1)$$

NBR_RH is "reachable neighbor node", and is given a value of 1 when the next hop destination is an immediate neighbor and reachable by the current node according to the routing table. Otherwise, NBR_RH is 0.

The variable stimulus is a function of the following:
a) packet coding/modulation rate with more efficient coding/modulation rate increases the metric level since they have a higher probability of packet error rate;
b) the packet classification according to the QoS with real time packets increases the metric level since these packets must be received correctly and cannot be retransmitted;
c) the SNR difference=(signal to noise ratio (SNR) estimate of the link from the current node to next-hop node)−(SNR estimate of link from original node to next-hop node) and with higher SNR difference having a higher metric value. This implies that if the link SNR between the original and next-hop node is high which is expressed as low SNR difference, cooperation is probably not needed. On the other hand, if the link SNR between the original and next-hop node is low which is expressed as high SNR difference, this node is a good help as a cooperating node. Hence our algorithm only enables cooperation when it is needed and eliminates it automatically when it is unnecessary and will only generate more interference to the system.
d) battery power levels of the client devices, nodes with lower power level may choose not to help while nodes with sufficient power will choose to help.

The variable threshold is proportional to a network congestion/interference level which can be determined by a collision rate detected at a current node or from interference measurement performed at the current node. When the neighborhood (i.e., sub network or network 100) surrounding the current node is detected to be busy, the current node will be silent and not interfere with nearby transmissions from other nodes. However, when the neighborhood is quiet, the current node can help nearby nodes through cooperation.

Determining Cooperation/Forwarding of Packets

A method that can be used to determine forwarding is a forwarding probability (P(forwarding)). An exemplary function is the following:

$$f(P(\text{forwarding})) = (P(\text{forwarding}))^2 \quad (2)$$

This function favors higher values of P(forwarding) and downgrades lower values of P(forwarding) by the squaring action. At each node, a random number between 0 and 1 can be generated. If the random number is less than $f(P(\text{forwarding}))$, the current node will participate in the transmission. Otherwise, the current or active node will remain silent. Other functions can be chosen as well.

The following is an illustrative scenario. Referring back now to FIG. 1, after Node K 122 transmits a packet to Node L 124; and Nodes F 112, P 132, G 114, L 124 and Q 134 can all "hear" the transmission. If Node L 132 did not receive the packet correctly, Node L 132 can send a NACK (not acknowledge) message to node K 122, and a retransmission from Node K 122 can take place. If this occurs, nodes Nodes F 112, P 132, G 114, L 124 and Q 134 can "hear" the NACK, and can cooperate with Node K 122 to transmit the packet to Node L 124 again. In an implementation, Nodes G 114 and Q 134, can have a higher probability of cooperating with Node K 122, than Nodes F 112 and P 132, since Nodes G 114 and Q 134 are closer to Node L 124. Nodes G 114 and Q 134 can also have a higher P(forwarding) due to higher SNR estimates from Nodes G 114 or Q 134, to Node L 124. The amount of time that each node will wait before re-transmission can be determined and exchanged among all neighbors during the periodic handshakes for synchronization purposes. For example, if CTS/RTS (clear to send, request to send) handshake is used, all neighboring nodes can know when a node should start to transmit after receiving the RTS (request to send), since this information could be exchanged during the periodic handshake.

If it is assumed that node L 124 and Nodes F 112, P 132, G 114, L 124 and Q 134 have all received the packets correctly. The packet can be forwarded from Node L 124 to Node M 126. It is noted Nodes F 112 and P 132 will not participate in forwarding the packet since Node M 126 is not an immediate neighbor of Nodes F 112 and P 132 and their P(forwarding) value will be zero since NBR_RH=0. The algorithm can automatically trim nodes that will not participate in the cooperation and reduce overall system interference level by allowing only nodes that can really help participate in the cooperation.

The time that a node will wait before forwarding a packet to the next hop can be known among neighbors since this information can be exchanged during the periodic handshake for synchronization. Once again, if CTS/RTS handshake is used, all neighboring nodes can know when a node will start to transmit after receiving the RTS. It can be assumed that Node L 124 transmits the packet to Node M 126 with help from Nodes G 114 and/or Q 134.

Next, as the packet arrives at Node M 126, although Nodes A 102, B 104, C 106, H 116, M 126, F 112, K 122, P 132, Q 134, and R 136 may receive the transmission since they are within transmission range, by applying the algorithm, only Nodes H 116 and R 136 can cooperate with Node M 126, in forwarding the packet to Node N 128. All other nodes will have zero P(forwarding), since Node N 128 is not an immediate neighbor of Nodes A 102, B 104, C 106, M 126, F 112, K 122, P 132, and Q 134. Similarly, for the last hop from Node N 128 to Node O 130, only Nodes 1118 and S 138 can cooperate with Node N 128 in transmitting the packet from Node N 128 to Node O 130.

Channel Capacity Gain at Destination Node Due to Cooperation

An exemplary analysis can be performed to show capacity gain due to cooperation from Nodes H 116, M 126 and R 136 to Node N 128. Because of the short distances among neighboring nodes and the periodic synchronization, it can be assumed that the neighboring nodes are more or less synchronized. For simplicity, the following scenario considers three single input single output (SISO) channels with equal gain combining at receiving Node N 128. The receive signal at node N from the pilots and data subcarriers are defined by the following:

$$y_N = (h_{H \to N} + h_{M \to N} + h_{R \to N}) S_{QAM} + n \quad (3)$$

Where $h_{H \to N} + h_{M \to N} + h_{R \to N}$ denotes the channel from transmitting node H/M/R to receiving node N, respectively;

$y_N$ denotes the receive signal on/at Node N 128 from Nodes H 116, M 126 and R 136;

$S_{QAM}$ denotes the QAM symbol transmitted on a subcarrier to Node N 128. If the subcarrier is a pilot, $S_{QAM}$ is known at Node N 128; and n denotes the thermal noise at Node N 128.

The final decoded symbol can be defined by the following:

$$\hat{S}_{QAM} = \frac{y_N \times ((h_{H \to N} + h_{M \to N} + h_{R \to N})')^*}{\|(h_{H \to N} + h_{M \to N} + h_{R \to N})'\|^2} \quad (4)$$

$$(h_{H \to N} + h_{M \to N} + h_{R \to N})' = y_N / S_{QAM} \quad (5)$$

Where $(\cdot)^*$ represents a complex conjugate and $\|\cdot\|$ represents magnitude square of a complex number of vectors and $(h_{H \to N} + h_{M \to N} + h_{R \to N})'$ is measured from pilot subcarriers. At Node N 128, the SNR with and without cooperation from Nodes H 116 and R 126 are respectively defined by the following:

$$SINR_{COOP} = \frac{\|(h_{H \to N} + h_{M \to N} + h_{R \to N})\|^2 \delta_{QAM}^2}{\delta_n^2} \quad (6)$$

$$SINR_{NO\_COOP} = \frac{\|h_{M \to N}\|^2 \delta_{QAM}^2}{\delta_n^2} \quad (7)$$

Where $\delta_{QAM}^2$ and $\delta_n^2$ are respectively, the signal and receive noise power. Under the worst case assumption of Rayleigh fading channels (with h generated using Gaussian variable with zero mean and variance of one, and setting $\delta_{QAM}^2 = \delta_n^2$, improvements can the cumulative distribution plot (CDF) of SNR with cooperation can be seen. At lower relatively lower SNR, an SNR gain of 5 dB can be seen. When translated to channel capacity using "Shannon's formula", cooperation can provide greater capacity at low SNR, translating in the ability to use the channel or not at low SNR values.

Exemplary Node Device

Figure 4:
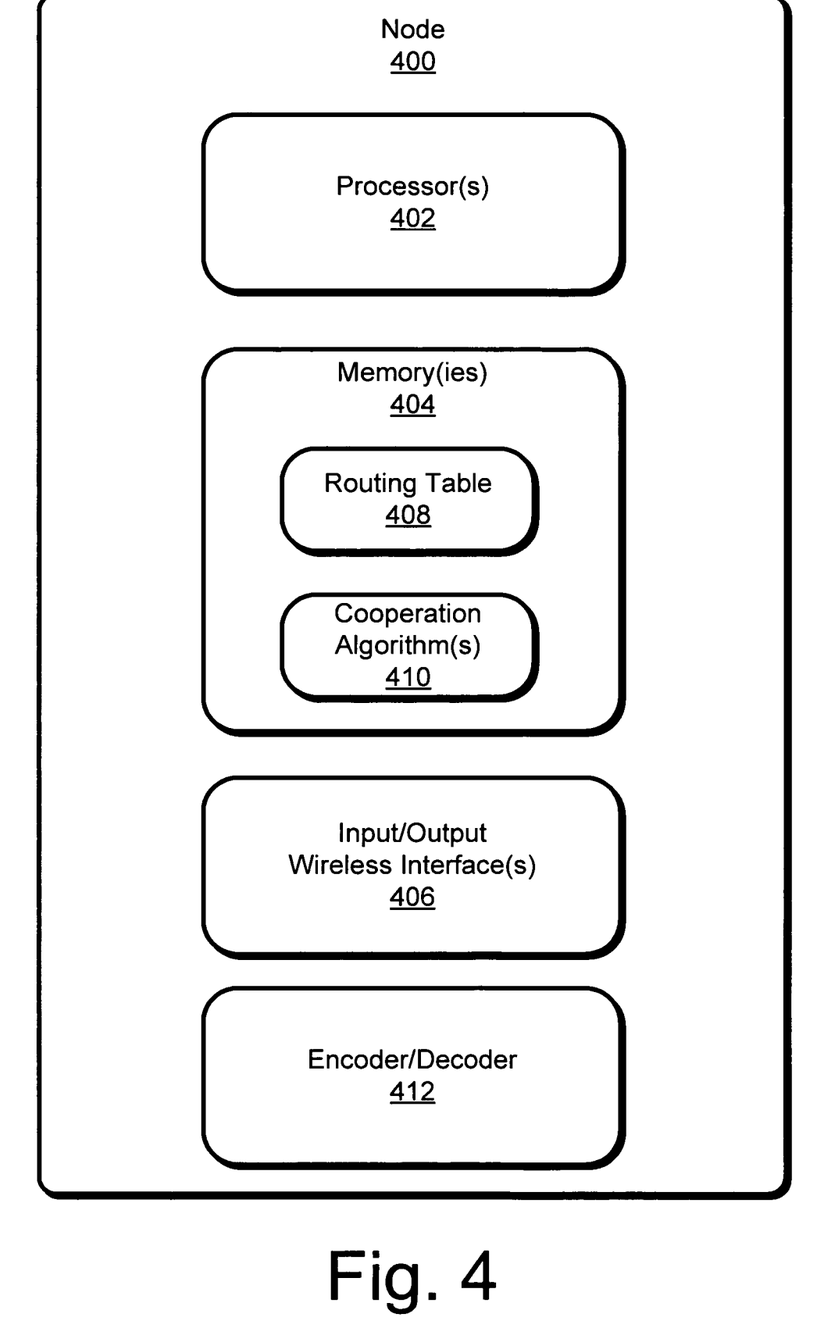
FIG. 4 is a block diagram of an exemplary device or node that implements swarm intelligence to enable cooperative communication.

FIG. 4 illustrates an exemplary device or node 400 that implements swarm intelligence to enable cooperative communication. The node 400 can be an exemplary embodiment of the previously discussed nodes, such as Nodes 102 to 140. As discussed above, node 400 can be one of various wireless devices and is part of mobile mesh or MANET network. The node 400 can move in and out of such a network. Furthermore, node 400 communicates and cooperates with other nodes in the network.

Node 400 includes one or more processors 402. The processors are configured to communicate with memory(ies) 404. Memory 404 can include various types of memory and/or memory devices, including but not limited to random access memory (RAM), read only memory (ROM), internal memory, and external memory. Memory 40 can furthermore include specific chipsets that implement the processes described herein. Memory 204 can include computer readable instructions operable by device 102. It is to be understood that components described herein, may be integrated or included as part of memory 204.

Node 400 can use one or more various wireless input and output interface protocols and standards, such as CDMA, IEEE 802.11 and its (sub)standards, etc. Node 400 includes wireless I/O for such wireless interface(s) as represented by block 410.

The memory 404 includes a routing table 406 which is implemented as discussed above. Memory 404 also includes algorithms 408 to address cooperative communications. The algorithms 408 include the algorithms/equations that are discussed above to support swarm intelligence and cooperative communication.

In this example, node 400 also includes an encoder/decoder 412. The no

Exemplary Process for Swarm Intelligence

Figure 5:
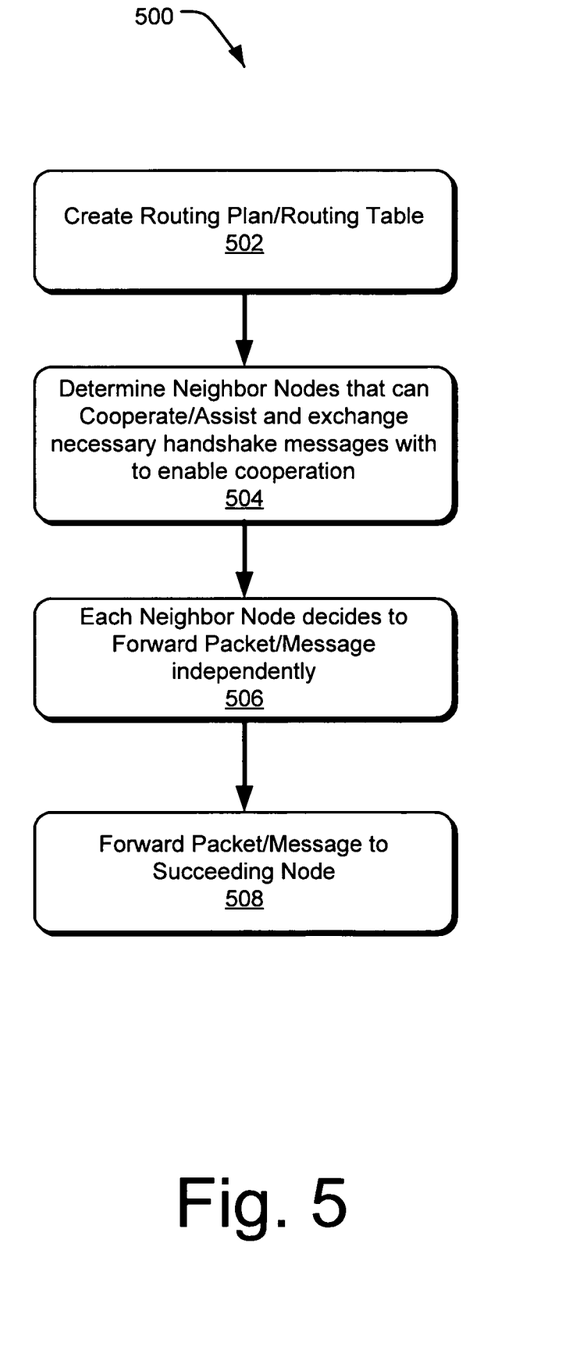
FIG. 5 is a flow chart for swarm intelligence to enable cooperative communication between nodes in a mesh network.

FIG. 5 is a flow chart for an example process 500 for swarm intelligence for cooperative communication in a mesh network. As an example, the swarm intelligence for cooperative communication may be performed by device or node 400. The order in which the method is described is not intended to be construed as a limitation, and any number of the described method blocks can be combined to implement the method, or alternate method. Additionally, individual blocks can be deleted from the method without departing from the spirit and scope of the subject matter described herein. Furthermore, the method can be implemented in any suitable hardware, software, firmware, or a combination thereof, without departing from the scope of the invention.

At block 502, creating a routing plan and/or a routing table is performed. The routing plan and routing table can be predetermined and used to describe the path of a packet or message from the node to successive nodes, and eventually to a destination node. The routing plan is a particular path from the node to the destination node, and the routing table provides information as to nodes that can be used to pass the packet or message.

At block 504, determining neighbor nodes to assist in cooperating or assisting in passing on the packet or message, is performed. In a structured matrix network having a consistent and uniform structure, as described above, candidate nodes to assist or cooperating would, for example, can be the adjacent or neighbor eight nodes. It is contemplated that the network may not be a uniform structure, and that candidate nodes to assist and cooperate can vary.

At block 506, deciding which neighbor node(s) that can cooperate or assist in sending the packet/message, is performed. The decision can be based on the forwarding function as discussed above. In particular, the forwarding probability function can be implemented. In any event, it is contemplated, that each node can decide the neighbor nodes that are used to cooperate or assist in forwarding the packet/message. This decision is independent from the network and/or other nodes.

At block 508, forwarding of the packet/message, is performed. The node sends the packet/message to the neighbor nodes that the node decides can assist or cooperate in communicating the packet/message. The forwarded packet/message may or may not be encoded before forwarding. Encoded packets/messages can be decoded by successive receiving nodes.

Conclusion

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these.

Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic disk storage or other magnetic storage devices, or any other medium which can be used to store the desired information and which can be accessed by a computing device.

What is claimed is:

1. A method implemented by a device to enable cooperative communication with other devices, in a mesh network after a routing plan has been created, comprising:

determining available neighbor devices that can receive a packet based on the routing plan based on the following probability forwarding equation:

$$P(\text{forwarding}) = \frac{NBR\_RH \times stimulus^2}{stimulus^2 + threshold^2}$$

where NBR_RH one of the available neighbor devices; stimulus is a function of one or more of the following, coding modulation rate, quality of service, signal to noise ratio, and battery power; and threshold is proportional to network congestion;

deciding which of the available devices to cooperate with; and forwarding the packet to other devices that are decided to cooperate with.

2. The method of claim 1, wherein the creating the routing plan is based on a routing table.

3. The method of claim 1, wherein the creating the routing plan comprises sending the routing plan to the available neighbor devices.

4. The method of claim 1, wherein the determining the available neighbor devices includes the closest proximate neighbor devices to the device.

5. The method of claim 1, wherein the determining the available neighbor devices is based on signal quality.

6. The method of claim 1, wherein the deciding which of the available devices to cooperate with, is based on probability forwarding function.

7. The method of claim 6, wherein the probability forwarding includes comparing a randomly generated number at the node to a value determined by the probability forwarding function.

8. The method of claim 1 further comprising determining channel capacity in the routing plan after the forwarding is performed.

9. A device to determine cooperation with other devices in mesh network, comprising:

one or more processors; and a memory coupled to the one or more processors, that comprises:

a routing table; and algorithms to determine the other devices to cooperate with, based on a routing plan created form the routing table, and proximity to the device, including determining available neighbors devices that can receive a packet based on the routing plan based on the following probability forwarding equation:

$$P(\text{forwarding}) = \frac{\text{NBR\_RH} \times \text{stimulus}^2}{\text{stimulus}^2 + \text{threshold}^2}$$

where NBR_RH one of the available neighbor devices; stimulus is a Function of one or more of the following, coding modulation rate, qualify of Service, signal to noise ratio, and battery power; and threshold is proportional to network congestion.

10. The device of claim 9, wherein the device and other devices communicate through wireless interfaces.

11. The device of claim 9, wherein the memory is a dedicated chipset.

12. The device of claim 9, wherein the routing table is predetermined.

13. The device of claim 9, wherein a value derived from the probability forwarding function is compared with a randomly generated number.

14. One or more non-transitory computer-readable storage media comprising:
   executing on one or more processors;
   creating a routing plan to be passed on to neighboring devices;
   determining available neighbor devices that can receive a data packet
   based on the following probability forwarding equation:

$$P(\text{forwarding}) = \frac{\text{NBR\_RH} \times \text{stimulus}^2}{\text{stimulus}^2 + \text{threshold}^2}$$

where NBR_RH one of the available neighbor devices; stimulus is a function of one or more of the following, coding modulation rate, quality of service, signal to noise ratio, and battery power; and threshold is proportional to network congestion;
   deciding which of the available devices to actually send the data packet; and
   forwarding the data packet to the devices that are decided to receive the data packet.

15. The one or more readable media of claim 14, wherein the routing plan is determined from a predetermined routing table.

16. The one or more readable media of claim 14, wherein the forwarding includes encoding the data packet.

17. The one or more readable media of claim 14, wherein acts are performed by nodes in a mobile mesh network.

* * * * *

UNITED STATES PATENT AND TRADEMARK OFFICE
CERTIFICATE OF CORRECTION

PATENT NO. : 8,411,567 B2
APPLICATION NO. : 12/803577
DATED : April 2, 2013
INVENTOR(S) : Wendy C. Wong et al.

Page 1 of 1

It is certified that error appears in the above-identified patent and that said Letters Patent is hereby corrected as shown below:

In the Claims

In column 8, line 59, in claim 9, delete "in" and insert -- in a --, therefor.

In column 8, line 66, in claim 9, delete "form" and insert -- from --, therefor.

In column 9, line 1, in claim 9, delete "neighbors" and insert -- neighbor --, therefor.

In column 9, line 11, in claim 9, delete "Function" and insert -- function --, therefor.

In column 9, line 12, in claim 9, delete "qualify of Service," and insert -- quality of service, --, therefor.

Signed and Sealed this
Fourth Day of June, 2013

Teresa Stanek Rea
*Acting Director of the United States Patent and Trademark Office*